(12) United States Patent
Chen

(10) Patent No.: US 8,508,365 B2
(45) Date of Patent: Aug. 13, 2013

(54) ALARM COLOR PLATE STRUCTURE OF A MICRO-DIFFERENTIAL PRESSURE GAUGE

(76) Inventor: Li-Chen Chen, Bade (TW)

(*) Notice: Subject to any disclaimer, the term of this patent is extended or adjusted under 35 U.S.C. 154(b) by 337 days.

(21) Appl. No.: 13/104,367

(22) Filed: May 10, 2011

(65) Prior Publication Data

US 2011/0285530 A1  Nov. 24, 2011

(51) Int. Cl.
*G08B 21/00* (2006.01)
(52) U.S. Cl.
USPC ... 340/540; 340/626; 340/815.4; 340/815.65; 340/815.78
(58) Field of Classification Search
USPC .......................................... 340/540
See application file for complete search history.

(56) References Cited

U.S. PATENT DOCUMENTS

| | | | | |
|---|---|---|---|---|
| 5,679,903 A | * | 10/1997 | Mock | 73/740 |
| 6,318,173 B1 | * | 11/2001 | Pearl | 73/431 |
| 2003/0136206 A1 | * | 7/2003 | Hamilton et al. | 73/866.3 |

* cited by examiner

*Primary Examiner* — Kerri McNally
(74) *Attorney, Agent, or Firm* — Chun-Ming Shih

(57) ABSTRACT

An alarm color plate structure of a micro-differential pressure gauge includes a transparent casing. The transparent casing has a slot which is located corresponding to the range of movement of a pointer or a scale plate. An alarm plate is provided in the slot. The alarm plate has a plurality of areas with different colors or marks for the user to know whether the position and the value of the pointer are normal or not.

8 Claims, 4 Drawing Sheets

ALARM COLOR PLATE STRUCTURE OF A MICRO-DIFFERENTIAL PRESSURE GAUGE

BACKGROUND OF THE INVENTION

1. Field of the Invention

The present invention relates to an alarm color plate structure of a micro-differential pressure gauge, and more particularly, to a pointer gauge structure having at least one alarm plate coupled on a transparent casing.

2. Description of the Prior Art

A conventional gauge, such as a micro-differential pressure gauge or a pressure gauge, includes a pointer therein. The pointer is rotated according to the pressure. In conjunction with a numeral scale plate in the gauge, the user can read the value. In general, the gauge is set with a security value. For the user to know whether or not the pointer is in the range of safety, the gauge is provided with a safety mark. The conventional mark is secured on an outer edge of the gauge. When the gauge has to be installed in an embedded way, such as in a hole of a flat board of an apparatus, the mark cannot be attached to the gauge because the circumferential edge of the gauge is tightly against the flat board. Accordingly, the inventor of the present invention has devoted himself based on his many years of practical experiences to solve this problem.

SUMMARY OF THE INVENTION

The primary object of the present invention is to provide an alarm color plate structure of a micro-differential pressure gauge. An alarm member is provided on a transparent casing, which doesn't exceed the circumference of the gauge, such that the alarm member can be easily coupled to the gauge which is installed in an embedded way.

In order to achieve the aforesaid object, there is provided an alarm color plate structure of a micro-differential pressure gauge. A transparent casing of a pressure gauge or a micro-differential pressure gauge has a slot which is located corresponding to the range of movement of a pointer or a scale plate. An alarm plate is provided in the slot. The alarm plate has a plurality of areas with different colors or marks for the user to know whether the position and the value of the pointer are normal or not.

Preferably, the slot is a curved slot corresponding to the pointer and the scale plate.

Preferably, the slot is formed by a corresponding slide track. The slot has a stop portion at one end thereof and an open end opposite the stop portion.

Preferably, the alarm plate is slid in the slot. The alarm plate is transparent, translucent or opaque. The alarm plate has one of a safe area, an alarm line, an abnormal area or a combination thereof.

Preferably, the safe area is green to show a safe state. The abnormal area is red to show an abnormal state.

Preferably, the present invention may have a plurality of alarm plates in different specifications to change the area and the position of the safe area, the alarm line and the abnormal area as desired.

DETAILED DESCRIPTION OF THE PREFERRED EMBODIMENTS

Embodiments of the present invention will now be described, by way of example only, with reference to the accompanying drawings.

Figure 1:
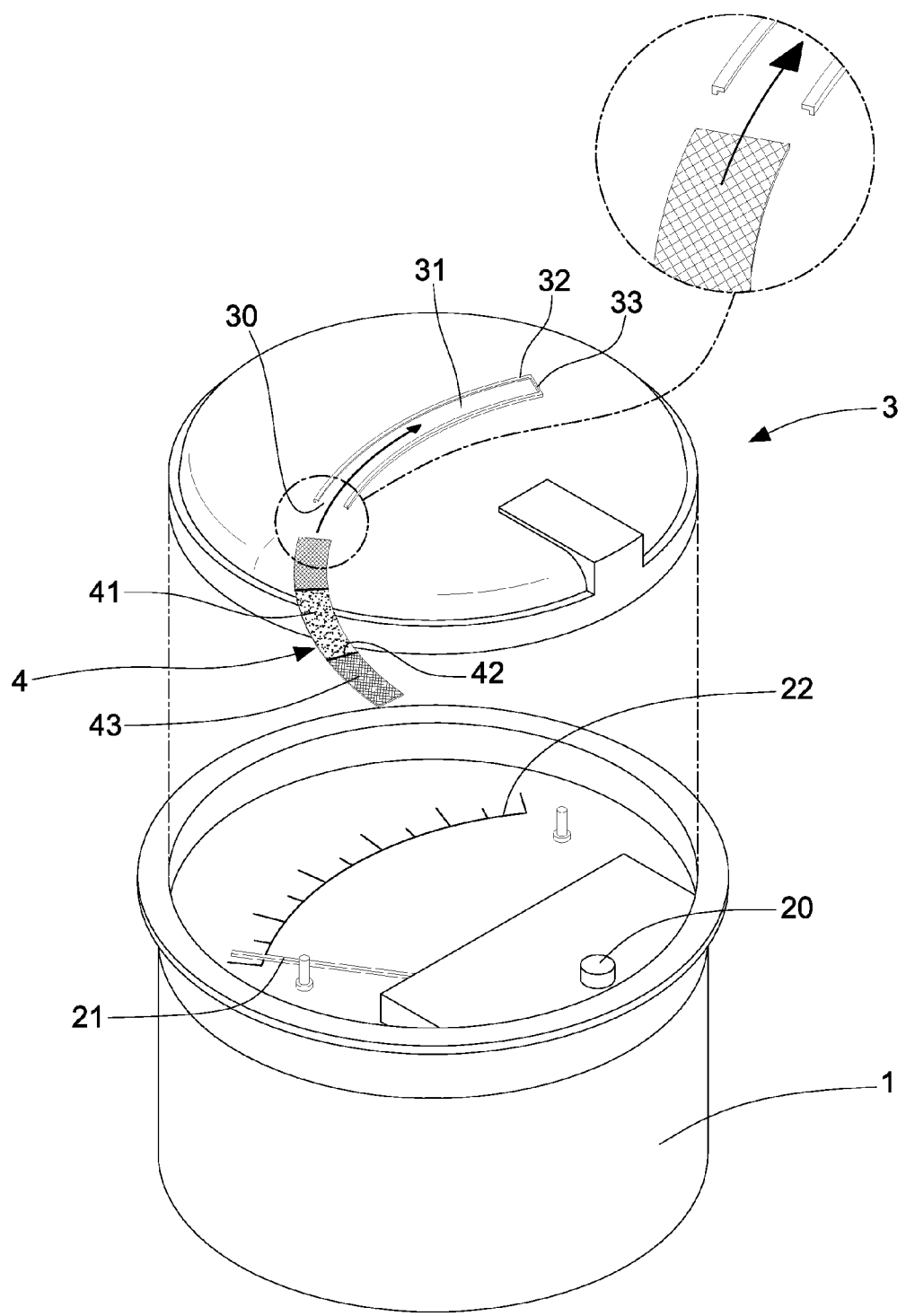
FIG. 1 is an exploded view according to a preferred embodiment of the present invention.
Figure 2:
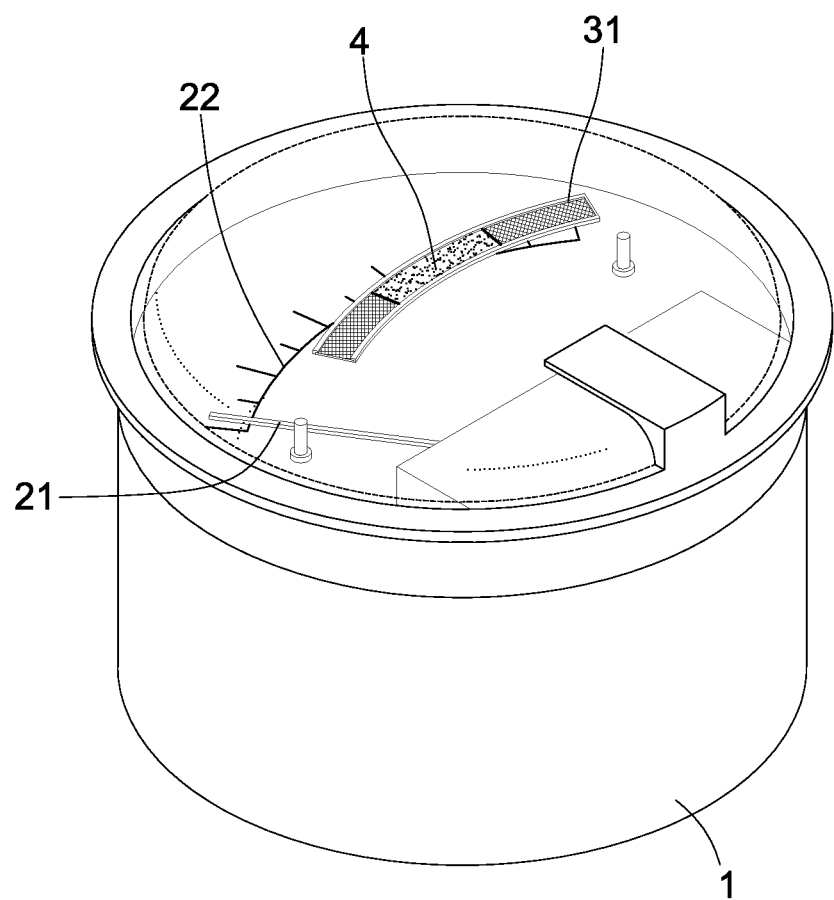
FIG. 2 is a perspective view according to the preferred embodiment of the present invention.

As shown in FIG. 1 and FIG. 2, an alarm color plate structure of a micro-differential pressure gauge according to a preferred embodiment of the present invention comprises a gauge base 1, a transparent casing 3, and an alarm plate 4.

The gauge base 1 is incorporated with other parts to become a pointer gauge which may be a pressure gauge or a micro-differential pressure gauge. The gauge base 1 comprises a pointer 21, an axle 20 and a scale plate 22 therein. The pointer 21 can be moved through the axle 20 in accordance with the inside pressure to display the numerical value on the scale plate 22.

The transparent casing 3 is coupled on the gauge base 1. The transparent casing 3 has a slot 31 which is located corresponding to the range of movement of the scale plate 22 and the pointer 21. The alarm plate 4 is located in the slot 31. The alarm plate 4 has a plurality of areas with different colors or marks for the user to know whether the position and the value of the pointer 21 are normal or not.

The slot 31 is a curved slot corresponding to the pointer 21 and the scale plate 22.

The slot 31 is formed by a corresponding slide track 32. The slot 31 has a stop portion 33 at one end thereof and an open end 30 opposite the stop portion 33.

The alarm plate 4 is slid in the slot 31. The alarm plate 4 is transparent, translucent or opaque. The alarm plate 4 has one of a safe area 41, an alarm line 42, an abnormal area 43 or a combination thereof.

The alarm line 42 is disposed beside the safe area 41. The abnormal area 43 is disposed beside the alarm line 41 opposing to the safe area 41.

The safe area 41 is green to show a safe state. The abnormal area 43 is red to show an abnormal state.

The present invention may have a plurality of alarm plates 4 in different specifications to change the area and the position of the safe area 41, the alarm line 42 and the abnormal area 43 as desired.

Figure 3:
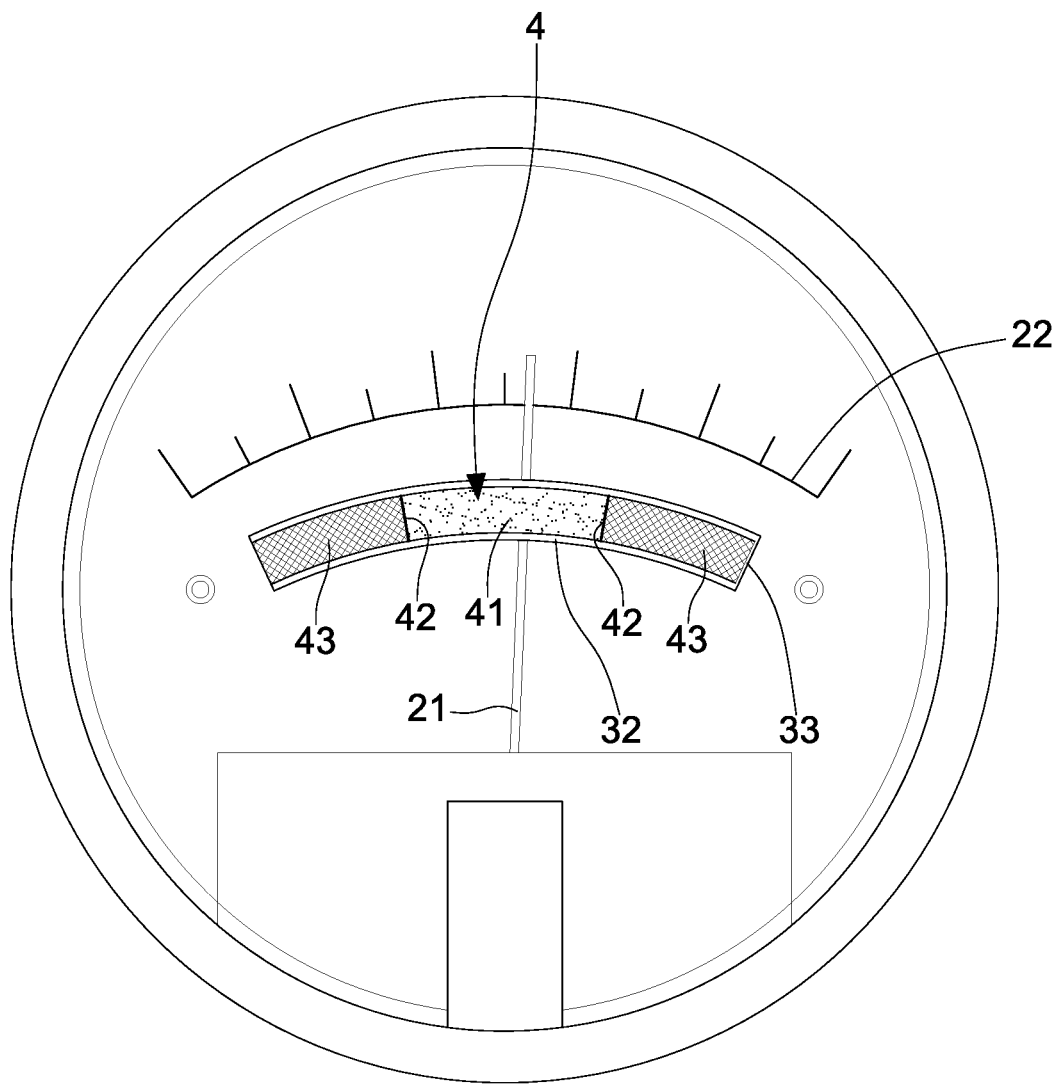
FIG. 3 is a top view according to the preferred embodiment of the present invention.

As shown in FIG. 1, one alarm plate 4 is slid in the slot 31 and stopped by the stop portion 33, so that the alarm plate 4 is secured in the slot 31. As shown in FIG. 3, the user can easily know the numerical state of the pointer 21 by the pointer 21 incorporated with the safe area 41, the alarm line 42 and the abnormal area 43.

Figure 4:
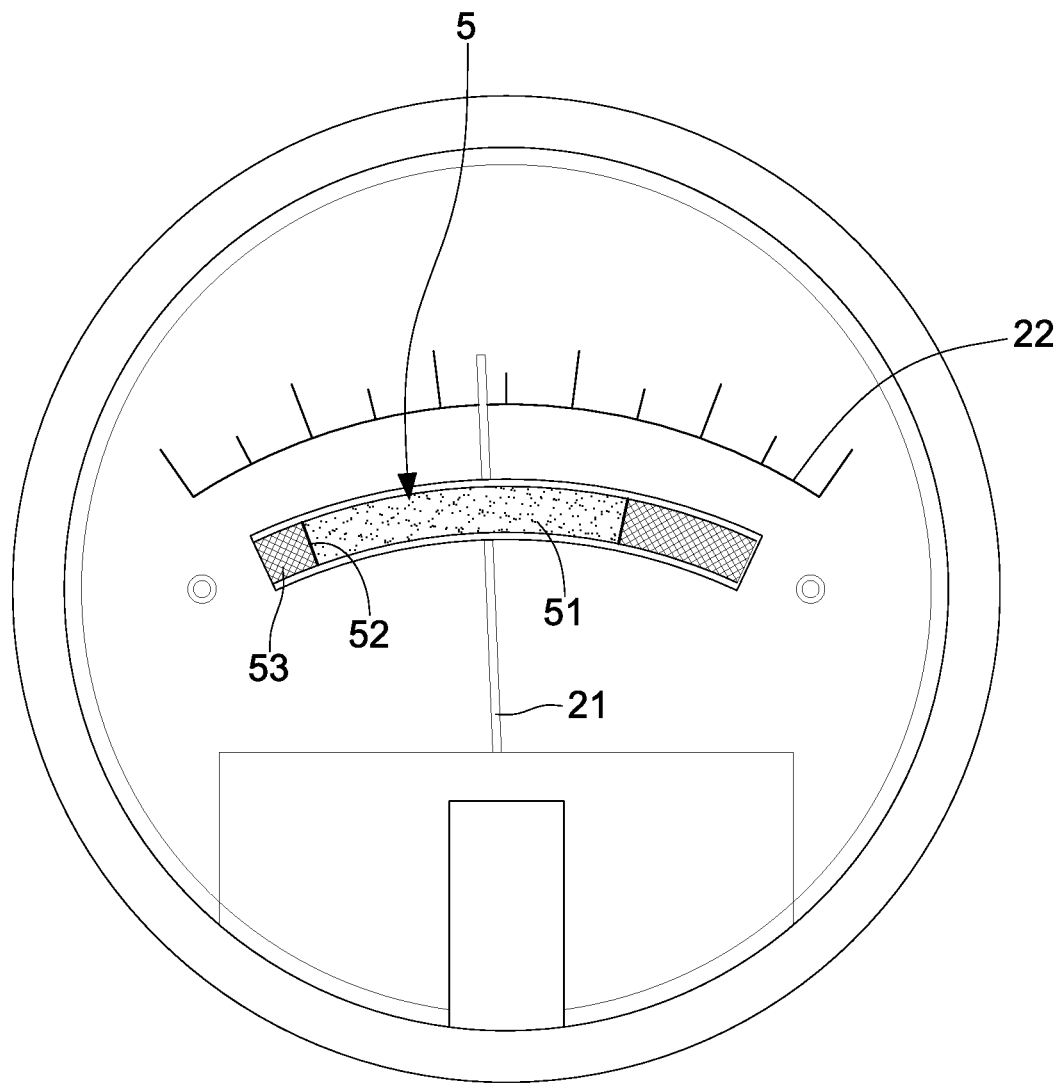
FIG. 4 is a schematic view to show another alarm plate of the present invention.

FIG. 4 is a schematic view to show another alarm plate 5. The safe area 51, the alarm line 52 and the abnormal area 53 of the alarm plate 5 are different from those of the aforesaid embodiment. The numerical area of the alarm plate is changeable.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An alarm color plate structure of a micro-differential pressure gauge, comprising:

a gauge base comprising a pointer, an axle and a scale plate therein, the pointer moving through the axle to display a numerical value on the scale plate;

a transparent casing coupled on the gauge base, the transparent casing having a slot which is located corresponding to the range of movement of the pointer; and an alarm plate located in the slot, the alarm plate having a plurality of areas with different colors or marks.

2. The alarm color plate structure of a micro-differential pressure gauge as claimed in claim 1, wherein the slot is a curved slot corresponding to the pointer and the scale plate.

3. The alarm color plate structure of a micro-differential pressure gauge as claimed in claim 1, wherein the slot is formed by a corresponding slide track.

4. The alarm color plate structure of a micro-differential pressure gauge as claimed in claim 3, wherein the slot has a stop portion at one end thereof and an open end opposite the stop portion.

5. The alarm color plate structure of a micro-differential pressure gauge as claimed in claim 1, wherein the alarm plate is transparent, translucent or opaque.

6. The alarm color plate structure of a micro-differential pressure gauge as claimed in claim 1, wherein the alarm plate has a safe area and an alarm line beside the safe area.

7. The alarm color plate structure of a micro-differential pressure gauge as claimed in claim 6, wherein the alarm plate further has an abnormal area beside the alarm line opposing to the safe area.

8. The alarm color plate structure of a micro-differential pressure gauge as claimed in claim 7, wherein the safe area and the abnormal area are in different colors.

\* \* \* \* \*